(No Model.)

J. A. TURNER.
RUBBER TIRE.

No. 454,092. Patented June 16, 1891.

WITNESSES

INVENTOR:
Joseph A. Turner,

UNITED STATES PATENT OFFICE.

JOSEPH A. TURNER, OF PASSAIC, NEW JERSEY.

RUBBER-TIRE.

SPECIFICATION forming part of Letters Patent No. 454,092, dated June 16, 1891.

Application filed January 21, 1891. Serial No. 378,617. (No model.)

*To all whom it may concern:*

Be it known that I, JOSEPH A. TURNER, a citizen of the United States, and a resident of Passaic, in the county of Passaic and State of New Jersey, have invented certain new and useful Improvements in Devices for Securing Rubber Tires to the Fellies of Wheels; and I do hereby declare that the following is a full, clear, and exact description of the invention, which will enable others skilled in the art to which it appertains to make and use the same, reference being had to the accompanying drawings, which form a part of this specification.

My invention relates to improvements in securing rubber tires to the fellies of wheels, whereby there is but little liability of their becoming loose or working off.

The invention consists in the novel construction hereinafter fully described, and definitely pointed out in the claims.

Figure 1:
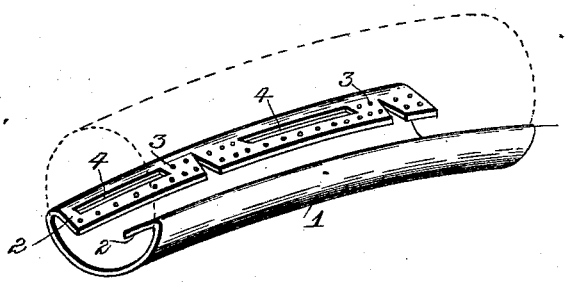
Figure 2:
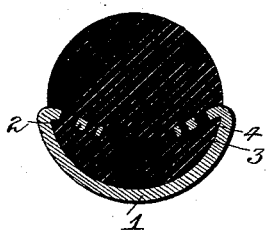

In the accompanying drawings, Figure 1 shows a portion of a wheel-felly constructed in accordance with my invention before the tire is applied thereto. Fig. 2 is a cross-section through the felly and tire.

In the said drawings, the reference-numeral 1 designates a metal felly, semicircular in cross-section, as usual in this class of wheels. The edges are then turned inward, forming a series of flanges 2, having V-shaped recesses therebetween. These recesses are cut or formed in the edges before the same are turned in and are for the purpose of preventing buckling. Each of these flanges is provided with a number of perforations 3 and longitudinal slots 4.

In carrying my invention into effect I take a wheel with the felly constructed as above described and pack the space underneath the flanges with unvulcanized rubber and across the space between the flanges, and also pack a sufficient amount of unvulcanized rubber above to fill in the molds which come to the edge of the felly. The rubber is then vulcanized, and the pressure of the molds will force the same through the perforations and slits in the flanges, which will cause the tire to be securely retained in place without danger of becoming loose.

Having thus described my invention, what I claim is—

1. A wheel-felly having a series of inwardly-turned flanges provided with perforations and slits, substantially as described.

2. As an improved article, a wheel comprising a metal felly having a series of inwardly-turned flanges with V-shaped recesses therebetween, a number of perforations and horizontal slits, and a rubber tire seated in the felly and retained therein by means of said flanges, substantially as described.

In testimony that I claim the foregoing as my own I have hereunto affixed my signature in presence of two witnesses.

JOSEPH A. TURNER.

Witnesses:
 STEPHEN DANIELS,
 R. B. ALLISON.